United States Patent
Ghebremeskel et al.

(10) Patent No.: US 11,118,105 B2
(45) Date of Patent: Sep. 14, 2021

(54) POLYVINYL ALCOHOL BASED DIVERTING AGENTS

(71) Applicant: KURARAY CO., LTD., Kurashiki (JP)

(72) Inventors: Ghebrehiwet Ghebremeskel, Houston, TX (US); Masaki Kato, Houston, TX (US); Levi Neufeld, Houston, TX (US); Brittany Spell, Houston, TX (US)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 16/554,078

(22) Filed: Aug. 28, 2019

(65) Prior Publication Data

US 2020/0071605 A1 Mar. 5, 2020

Related U.S. Application Data

(60) Provisional application No. 62/723,619, filed on Aug. 28, 2018.

(51) Int. Cl.
| | |
|---|---|
| *C09K 8/88* | (2006.01) |
| *C08F 216/38* | (2006.01) |
| *C08F 220/18* | (2006.01) |
| *C08L 29/14* | (2006.01) |
| *C08L 33/06* | (2006.01) |
| *E21B 33/138* | (2006.01) |

(52) U.S. Cl.
CPC ............ *C09K 8/885* (2013.01); *C08F 216/38* (2013.01); *C08F 220/18* (2013.01); *C08L 29/14* (2013.01); *C08L 33/062* (2013.01); *E21B 33/138* (2013.01); *C08L 2205/06* (2013.01)

(58) Field of Classification Search
None
See application file for complete search history.

(56) References Cited

U.S. PATENT DOCUMENTS

| | | | |
|---|---|---|---|
| 4,119,604 A | 10/1978 | Wysong | |
| 5,362,778 A | 11/1994 | Famili et al. | |
| 8,955,430 B2 | 2/2015 | Leblanc et al. | |
| 2010/0243242 A1* | 9/2010 | Boney | E21B 43/26 166/250.01 |
| 2012/0272838 A1 | 11/2012 | Leblanc et al. | |
| 2015/0233226 A1 | 8/2015 | Holzhauser et al. | |
| 2016/0122618 A1* | 5/2016 | Nguyen | C09K 8/03 166/307 |
| 2017/0166798 A1* | 6/2017 | Okamoto | C04B 28/02 |
| 2017/0260309 A1 | 9/2017 | Collins et al. | |
| 2019/0023825 A1 | 1/2019 | Collins et al. | |

FOREIGN PATENT DOCUMENTS

| | | |
|---|---|---|
| CN | 107266838 A | 10/2017 |
| CN | 107936431 A | 4/2018 |
| WO | WO 2015/026355 A1 | 2/2015 |
| WO | WO 2019/031613 A1 | 2/2019 |

OTHER PUBLICATIONS

International Search Report and Written Opinion dated Nov. 12, 2019 in PCT/US2019/048641, 16 pages.
International Search Report and Written Opinion dated Oct. 29, 2019 in PCT/US2019/048610, 16 pages.
International Search Report and Written Opinion dated Oct. 31, 2019 in PCT/US2019/048595, 21 pages.
International Search Report and Written Opinion dated Oct. 25, 2019 in PCT/US2019/048626, 16 pages.
Chikhacheva, I.P., et al., "Polymer-Analog Reactions of Polyvinyl Alcohol under the Action of Microwave Radiation", Russian Journal of General Chemistry, vol. 81 No. 3, 2011, pp. 545-549.

* cited by examiner

*Primary Examiner* — Jeffrey D Washville
(74) *Attorney, Agent, or Firm* — Oblon, McClelland, Maier & Neustadt, L.L.P.

(57) ABSTRACT

Provided are particulate polyvinyl alcohol-based diverting agents for use in subterranean treatments, which are prepared by compacting a specified polyvinyl alcohol copolymer optionally with certain specified additives and optionally other polyvinyl alcohols.

20 Claims, No Drawings

POLYVINYL ALCOHOL BASED DIVERTING AGENTS

CROSS-REFERENCE TO RELATED APPLICATIONS

This application claims priority under 35 U.S.C. § 119 from U.S. Provisional Application Ser. No. 62/723,619, filed 28 Aug. 2018, the disclosure of which is incorporated by reference herein for all purposes as if fully set forth.

FIELD OF THE INVENTION

The present invention relates to particulate, polyvinyl alcohol-based diverting agents for use in subterranean treatments. In particular, the present invention relates to particulate diverting agents manufactured by compacting specified polyvinyl alcohol copolymers optionally with certain specified additives and/or other polyvinyl alcohols.

BACKGROUND OF THE INVENTION

During oil production from subterranean formations by natural forces, only a small fraction of the total oil present in the reservoir is recovered. A variety of techniques have been developed to recover oil beyond that which is produced by the natural forces. The normal procedure is to introduce a fluid into the oil-bearing formation in order to displace the oil to a production system comprising one or more production wells. The displacing fluid may, for example, be brine, fresh water, steam, or gas. The most cost-effective recovery methods are known to utilize steam.

One technique for increasing production is to increase the porosity of the oil-bearing formation by injection of a high-pressure drive fluid to fracture the formation, thereby allowing further access of the displacing fluid into the oil-bearing formation.

Some of the common injection drive fluids are much lighter than the reservoir fluids and thus rise toward the top of the flowing region bypassing the lower regions. In that case, the displacement of the oil from the formation is improved by the addition of the polymeric thickening agents that increase the effective viscosity of the drive fluid to match to that of the oil to be displaced.

Such injection fluids preferentially enter higher permeability areas (typically containing less oil), thus not reaching their intended targets (lower permeability areas). It is therefore desirable to plug the regions of higher permeability to divert the drive fluid into regions of lower permeability.

Physical plugging of the high permeability regions by cements and solid slurries has been tried with varying degrees of success. These techniques, however, have the drawback that they may remain intact for extended periods (or even permanently), and still-productive sites may consequently be permanently closed or require extraordinary efforts to reopen.

Several techniques of addressing the issue with the areas of differing permeability within a wellbore have been disclosed in the patent literature.

For example, U.S. Pat. No. 2,803,306 discloses a process for increasing the permeability of an underground formation having several zones of varying permeability. The treatment fluid utilized contains hydrochloric acid with oil-soluble particles dispersed in it. The dispersed particles provide a partial blockage of the more permeable zones of the subterranean formation, thereby allowing the treatment fluid to enter to the less-permeable zones. Since the particles are oil soluble, the blockage is temporary and the dissolved particles will ultimately flow out with produced oil.

U.S. Pat. No. 3,724,549 describes a material for diverting aqueous treatment fluids into progressively less permeable subterranean formations. The described material is composed of a carrier liquid and graded particles of cyclic or linear hydrocarbon resins having between 20 and 1400 carbon atoms, and a melting point of about 200° F. The particles should generally be graded from a 3 mesh to a 200 mesh sieve, with certain preferred particle size distributions within these boundaries. The solubility profile of the particles is described as being largely water and acid insoluble, but soluble in oil. This means that the particles are designed to be removed by the produced oil after the completion of the oil treatment operation.

U.S. Pat. No. 3,797,575 discloses diverting-forming additives comprised of relatively water-insoluble solid material dissolved in a solvent such as methanol or isopropanol. When the additive is combined with an aqueous treatment fluid, the solid material, dissolved in the additive, is precipitated in the aqueous treating fluid into a finely divided form, which then acts as a diverting agent.

U.S. Pat. No. 3,872,923 discloses the use of certain radiation-induced polymers as either temporary or permanent diverting agent. According to the specification, temporary or permanent reductions in permeability can be obtained by injecting an aqueous solution containing a water-soluble polymer obtained by radiation-induced polymerization of acrylamide and/or methacrylamide and acrylic acid, methacrylic acid, and/or alkali metal salts of such acids. The resultant polymeric diverting agent has properties, such as temperature and pH stability, so as to effect a reduction of permeability of the porous medium. Permeability within the formation can be restored by subsequent treatment with a chemical to break down the polymer, such as hydrazine hypochlorite solution or strong mineral acids.

U.S. Pat. Nos. 3,954,629 and 4,005,753 disclose polymeric diverting agent, and methods of treating subterranean formations with such polymeric diverting agent. The disclosed polymeric compositions comprise solid particles of a homogenous mixture of polyethylene, ethylene-vinyl acetate copolymer, a polyamide, and a softening agent such as a long chain aliphatic diamide. The disclosed polymeric diverting agents are said to be suitable for use in subterranean formations where formation temperatures are 350° F. or higher, and are also said have controlled (slow) oil-solubility for ultimately removal.

U.S. Pat. No. 4,527,628 describes methods of temporarily plugging a subterranean formation using a diverting material comprising an aqueous carrier liquid and a diverting agent comprising a solid azo component and a methylenic component having a melting point of at least 332.6° F., a degree of solubility in water at a temperature of water from about 200° F. to about 425° F., and a degree of solubility in kerosene at a temperature of from about 200° F. to about 425° F.

U.S. Pat. No. 4,665,986 discloses a polyvinyl alcohol based gel-forming composition to reduce channeling in subsurface formations. The composition comprises a specified polyvinyl alcohol or copolymer and a gelling (cross-linking) agent, which reacts to form a gel for stably plugging un-productive steam channels.

U.S. Pat. No. 6,367,548B1 describes methods and compositions for stimulating multiple intervals in subterranean wells by diverting well treatment fluids into multiple intervals. According to the description, this is accomplished by alternately displacing diverting agent from the annulus of the wellbore into a subterranean formation and displacing treatment fluid from a tubing string into the subterranean formation.

US2011/0005761A1 describes a degradable diverting agent comprising a material selected form a fatty alcohol, fatty ester, proteinous material and a fatty acid salt, which may be used in combination with other types of degradable diverting agents.

WO2006/088603A1 discloses the use of diverting agents coated with certain specified water-soluble materials including a collagen, poly(alkylene oxide), poly(lactic acid), polyvinylalcohol and a polyvinyl acetate/polyvinylalcohol polymer. Following completion of the treatment, the publication indicates that the diverting agent can be removed from the formation by dissolving the water-soluble coating.

SUMMARY OF THE INVENTION

In accordance with the present invention, it has been found that certain specified polyvinyl alcohol copolymer resins compacted in combination with optional specified additives are highly effective diverting agents for use in subterranean treatments.

In a first aspect, the invention provides a particulate diverting agent comprising particles of a compacted polyvinyl alcohol component comprising a hydrolyzed copolymer of vinyl acetate and one or more unsaturated acids as comonomers ("acid-functional polyvinyl alcohol copolymer"), wherein
(a) the unsaturated acid is selected from the group consisting of
  (i) a monocarboxylic unsaturated acid,
  (ii) a dicarboxylic unsaturated acid,
  (iii) an alkyl ester of (i),
  (iv) an alkyl ester of (ii),
  (v) an alkali metal salt of (i),
  (vi) an alkali metal salt of (ii),
  (vii) an alkaline earth metal salt of (i),
  (viii) an alkaline earth metal salt of (ii), and
  (ix) an anhydride of (i) and (x) an anhydride of (ii), and
(b) the copolymer
  (i) has an unsaturated acid content of from about 0.1 mol % to about 15 mol % based on the total moles of monomers,
  (ii) has a viscosity-average degree of polymerization of from about 300 to about 3000,
  (iii) has a degree of hydrolysis of from about 70 mol % to 100 mol %, and
  (iv) is substantially soluble in water and brine at a temperature of 195° F. or higher; and
(c) the particulate diverting agent has a bulk density greater than about 0.9 g/cc.

In one embodiment, the particulate diverting agent is a compacted mixture comprising the polyvinyl alcohol component and at least one additive selected from the group consisting of a starch, a plasticizer and a filler. In another embodiment, the particulate diverting agent comprises a weighting agent as the filler.

In another embodiment, the polyvinyl alcohol component comprises a mixture of an acid-functional polyvinyl alcohol copolymer with at least one other polyvinyl alcohol. In another embodiment, the other polyvinyl alcohol has a water solubility lower than the acid-functional polyvinyl alcohol copolymer. In another embodiment, the other polyvinyl alcohol is a fully- or partially-hydrolyzed polyvinyl alcohol homopolymer.

In another embodiment, the polyvinyl alcohol resin component is a "transition product" as defined and described below.

In another embodiment, the present invention relates to a method of making the particulate diverting agent, comprising the steps of (A) compacting the polyvinyl alcohol component (or mixture with optional additives) and (B) granulating the compacted polyvinyl alcohol component to generate the particulate diverting agent.

In another embodiment, the method further comprises the step of sorting after granulating to a desired particle size for the particulate diverting agent.

More specifically, the diverting agents of the present invention are prepared by placing the mixture (polyvinyl alcohol resin component and optional additive(s)) under extreme pressure. As the resin adheres to itself in the compaction process, no additional binder is needed to agglomerate the mixture. In other words, the specified polyvinyl alcohol component functions as the binder for the agglomerate. Additives such as fillers, starches and plasticizers are added to the resin as desired or as necessary. The resin compaction can be carried out using conventional compaction methods and equipment, such as a double roll compactor. The compacted mixture can be crushed and screened to appropriate particle size. Pelletization using conventional methods may also be utilized to the extent that sufficient bulk density can be achieved.

The diverting effects of the polyvinyl alcohol used in this invention are temporary as the specified acid-functional polyvinyl alcohol copolymers are water and brine soluble at elevated temperatures, and thus the diverting agent deteriorates after a period of time at temperatures in the subterranean formation.

In another embodiment, the present invention relates to a method of treating a subsurface formation to divert flow of a fluid from one zone of the subsurface formation to another, by pumping into the subsurface formation an aqueous carrier liquid having dispersed therein the particulate diverting agent of the present invention.

The particulate diverting agents of the present invention are particularly suitable for use in subterranean formations where formation temperatures are typically about 195° F. or lower. In some cases, however, the particulate diverting agent can have suitable stability for sufficient time periods at temperatures of up to about 250° F.

The application temperature of the diverting agents of this invention can be extended to higher-temperature wells by lowering the temperature within the wellbore by removing the native heat from surrounding formations during stimulation. Lowering the well temperature will decrease the solubility rate of the diverting agent. In fact, the stimulation fluid can be circulated at a flow rate sufficient to cool the water-soluble diverting agent to a stable temperature where the diverting agent is stable for at least about 3 hours, and in some cases at least about 3 days.

An additional advantage of the polyvinyl alcohol-based particulate diverting agents of the present invention is that they are environmentally friendly as they are temporary, and polyvinyl alcohols in general are considered non-toxic and biodegradable.

These and other embodiments, features and advantages of the present invention will be more readily understood by those of ordinary skill in the art from a reading of the following detailed description.

DETAILED DESCRIPTION

The present invention relates to particulate polyvinyl alcohol-based diverting agents for use in subterranean treatments. In particular, the present invention relates to particulate diverting agents manufactured by compacting specified polyvinyl alcohol copolymers with certain optional additives and optionally other polyvinyl alcohols. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion", as used herein, unless otherwise defined herein, means that greater than 50% of the referenced material. If not specified, the percent is on a molar basis when reference is made to a molecule (such as hydrogen, methane, carbon dioxide, carbon monoxide and hydrogen sulfide), and otherwise is on a weight basis (such as for carbon content).

The term "substantial portion" or "substantially", as used herein, unless otherwise defined, means all or almost all or the vast majority, as would be understood by a person of ordinary skill in the relevant art in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising vinyl acetate and 15 mol % of a comonomer", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "unit" refers to a unit operation. When more than one "unit" is described as being present, those units are operated in a parallel fashion unless otherwise stated. A single "unit", however, may comprise more than one of the units in series, or in parallel, depending on the context. For example, a thermal treating unit may comprise a first cooling unit followed in series by a second cooling unit.

The term "free-flowing" particles (or agglomerates) as used herein means that the particles do not materially further agglomerate (for example, do not materially further aggregate, cake or clump), as is well understood by those of ordinary skill in the relevant art. Free-flowing particles need not be "dry" but, desirably, the moisture content of the particles is substantially internally contained so that there is minimal (or no) surface moisture.

The term "substantially soluble in water" and "soluble in water" means substantially completely (or completely) soluble in deionized water under the stated conditions.

The term "substantially soluble in brine" and "soluble in brine" means substantially completely (or completely) soluble in "brine" under the stated conditions. For the purposes of the present invention, "brine" generally means a water solution with NaCl concentration of up to 2.9 wt %.

For convenience, many elements of the present invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Polyvinyl Alcohol Copolymers

The resins used in the manufacture of the diverting agent of this invention are polyvinyl alcohol based. Polyvinyl alcohol homopolymers and copolymers are in a general sense well-known polymers and are generally commercially available in many forms for a variety of end-uses.

Polyvinyl alcohol cannot readily be produced directly from vinyl alcohol. Instead, polyvinyl alcohol is produced on a commercial scale by polymerizing vinyl acetate (with optional comonomers) to generate polyvinyl acetate, after which the acetate groups are hydrolyzed to hydroxyl groups in varying degrees. Several different hydrolysis methods are well-known and can be used for this purpose.

Polyvinyl alcohol copolymers for use in the present invention are hydrolyzed "acid-functional" polyvinyl acetate copolymers.

The polyvinyl acetate copolymer starting material is typically produced by the free radical polymerization of the vinyl acetate monomer with one or more "acid-functional" comonomers in the presence of a polymerization catalyst. The solvent commonly used in the commercial polymerization of vinyl acetate is methanol. The polymerization is typically conducted in the temperature range of from about 10° C. to about 80° C. The lower end of the polymerization range is known to give products with improved properties. The percent conversion of vinyl acetate to polyvinyl acetate can vary over a wide range. Though conversions ranging from about 20% to 100% have been found satisfactory, commercially at least about 30% conversion is preferable.

The "acid-functional" comonomer is one or more of (i) a monocarboxylic unsaturated acid, (ii) a dicarboxylic unsaturated acid, (iii) an alkyl ester of (i), (iv) an alkyl ester of (ii), (v) an alkali metal salt of (i), (vi) an alkali metal salt of (ii), (vii) an alkaline earth metal salt of (i), (viii) an alkaline earth metal salt of (ii), (ix) an anhydride of (i), and (x) an anhydride of (ii).

Some of the examples of such comonomers include methacrylic acid, methyl methacrylate, 2-hydroxyethyl acrylate, hydroxyl methacrylate, ethyl methacrylate, n-butyl methacrylate, maleic acid, monomethyl maleate, dimethyl maleate, maleic anhydride, itaconic acid, monomethyl itaconate, dimethyl itaconate, and itaconic anhydride.

Preferred are lower alkyl (C1-C8, or C1-C4) acrylates and methacryles. Non-limiting examples of such comonomers include methyl acrylate, methyl methacrylate, ethyl acrylate, ethyl methyacrylate, i-propyl acrylate, i-propyl methacrylate, n-propyl acrylate, n-propyl methacrylate, i-butyl acrylate, i-butyl methacrylate, n-butyl acrylate, n-butyl methacrylate, t-butyl acrylate, t-butyl methacrylate, ethylhexyl acrylate, ethylhexyl methacrylate and others.

Preferred comonomers include methyl acrylate, methyl methacylate and mixtures thereof, and particularly methyl acrylate.

The comonomer content of polyvinyl acetate copolymer (and resulting polyvinyl alcohol copolymer) ranges from about 0.1 mol %, or from about 0.5 mol %, or from about 1 mol %, to about 15 mol %, or to about 10 mol %, or to about 8 mol %. In the case of methyl acrylate, the amount is typically about 10 mol % or less, based on the total moles of monomer. In the case of methyl methacrylate, the amount is typically about 5 mol % or less, based on the total moles of monomer.

The viscosity-average degree of polymerization of polyvinyl acetate copolymer (and resulting polyvinyl alcohol copolymer (2)) varies anywhere from about 300, or from about 500, or from about 700, to about 3000, or to about 2000. The viscosity-average degree of polymerization of a polyvinyl alcohol copolymer is a value measured in accordance with JIS K6726 (1994).

The polyvinyl acetate is converted to polyvinyl alcohol via hydrolysis or alcoholysis processes generally known to those of ordinary skill in the relevant art. In such processes, the polyvinyl acetate is contacted with an alkali catalyst such as sodium hydroxide or sodium methylate. The major products of this reaction are polyvinyl alcohol and methyl acetate.

Examples of commercially available acid-functional polyvinyl alcohols include KURARAY POVAL™ K-series grades such as 32-97KL, 25-88KL, 6-77KL and 30-94KL (Kuraray Co., Ltd., Tokyo Japan).

One such process is a slurry alcoholysis process in which polyvinyl alcohol is obtained from polyvinyl acetate and recovered as a slurry in a methanol and methyl acetate solvent system. Such process is desirably continuous. The slurry alcoholysis process is in a general sense well known to those of ordinary skill in the relevant art, such as disclosed in U.S. Pat. No. 2,734,048, and the resulting polyvinyl alcohols are agglomerated particles of a "popcorn" morphology as described below. A suitable acid-functional polyvinyl alcohol copolymer produced by slurry alcoholysis is commercially available under the trade designation ELVA-NOL™ 80-18 (Kuraray America, Inc., Houston, Tex. USA).

Regardless of the hydrolysis process, the resulting polyvinyl alcohols, of course, will have substantially the same monomer makeup and degree of polymerization as the starting polyvinyl acetates.

The polyvinyl alcohol copolymer should have a degree of hydrolysis of from about 70 mol %, or from about 75 mol %, or from about 85 mol %, or from about 93 mol %, or from about 95 mol %, or from about 98 mol %, or from about 99 mol %, to 100 mol % (maximum). The degree of hydrolysis can be measured in accordance with JIS K6726 (1994).

One method of varying the rate of the dissolution of the particulate diverting agent is by varying the crystallinity of the polyvinyl alcohol resin.

For example, for polyvinyl alcohol copolymers with increased water solubility, the slurry alcoholysis processes as described in US2017/0260309A1 and US2019/0055326A1, the disclosure of which is incorporated by reference herein for all purposes as if fully set forth) may used for hydrolyzing the polyvinyl acetate copolymer to polyvinyl alcohol copolymer.

As described in the above-incorporated disclosures, suitable polyvinyl alcohol copolymers can be produced by a slurry alcoholysis process in which polyvinyl alcohol is obtained from polyvinyl acetate and recovered as a slurry in a methanol and methyl acetate solvent system.

In one embodiment, a first solution of typically about 30 wt % to about 60 wt % polyvinyl acetate copolymer in methanol, and a second solution of dilute sodium methylate alcoholysis catalyst in methanol, are continuously fed to an alcoholysis unit wherein the reaction proceeds to produce a first slurry of the alcoholyzed polyvinyl acetate (polyvinyl alcohol) and methyl acetate.

Catalyst amount typically ranges from about 0.2 wt % to about 0.5 wt % based on the weight of the reaction mixture.

The temperature of the alcoholysis reaction in the alcoholysis unit is typically from about 58° C., or from about 64° C., to about 70° C., or to about 68° C. The pressure within the alcoholysis unit ranges from slightly below atmospheric pressure to slightly above atmospheric pressure, but is typically slightly above atmospheric pressure.

The alcoholysis unit contains an agitation means so that the alcoholysis is at least partially conducted under agitation conditions. Such agitation means are well known to those of ordinary skill in the relevant art.

When the alcoholysis reaches about 40-50%, the polymer partially precipitates. The insoluble material takes the form of a gel of polymer molecules solvated with methanol. As the solubility decreases by further alcoholysis, the gel becomes tougher and begins to reject the associated solvent molecules. When the alcoholysis is completed, the polymer and solvent are mutually insoluble. If this gel is allowed to stand undisturbed, alcoholysis proceeds and the product is obtained in a massive, unworkable form. However, if the gel is worked mechanically (agitated) during this range above about 40% alcoholysis, the polymer will break down to finely-divided solids insoluble in the alcohol. The collapsing gel traps and sticks together with the fine particles from the previous alcoholysis cycle producing polyvinyl alcohol of a desired "popcorn ball" morphology.

In one embodiment, the alcoholysis unit is made up of a primary alcoholysis vessel where the reaction proceeds to produce a slurry of partially alcoholyzed polyvinyl acetate. The slurry from the primary alcoholysis vessel overflows to an agitated hold vessel which provides additional residence time for completing the alcoholysis reaction. The slurry from the agitated hold vessel is then pumped through one or more finisher units to react short-circuited polyvinyl acetate, thus ensuring that the conversion is raised to 99.5% or higher of desired completion.

Preferred conversion is a degree of hydrolysis as set forth above.

The resulting first polyvinyl alcohol slurry may then optionally be fed to a neutralizing unit along with an acid to fully or partially neutralize remaining alcoholysis catalyst. In one embodiment, the catalyst is substantially neutralized. In another embodiment, less than a predominant portion (less than 50 equivalent %), or less than about 25 equivalent %, or less than about 10 equivalent %, or less than about 5 equivalent %, of any excess alkali catalyst, can be neutralized. Typically, the acid employed is acetic acid. The temperature entering neutralizing unit is slightly lower than in the alcoholysis unit, generally in the range of from about 53° C. to about 60° C., and typically in the range from about 55° C. to about 58° C. Pressure conditions in the neutralizing unit are typically similar to those in the alcoholysis unit.

A second slurry is generated from the neutralizing unit. If present, the neutralizing unit can also be used to control the pH of the resulting second slurry.

In one embodiment, the neutralizing unit is not present (or is bypassed if present, or is present with substantially no acid feed, or is present with no acid feed), and the excess alkali catalyst is substantially not neutralized (or not neutralized) and remains in first slurry.

In one embodiment, the second slurry resulting from the neutralization unit, if present, or if not present the first slurry, is then fed to an optional thermal treating unit. The temperature of the first slurry, or the second slurry if present, may be elevated or reduced in the thermal treating unit depending on the desired solubility of the resulting polyvinyl alcohol copolymer. If higher solubility is desired, the temperature can be reduced to less than about 50° C., or to less than about 40° C., or to less than about 35° C., or to less than about 30° C., or to less than about 25° C., or to less than ambient conditions, with the lower temperatures resulting in higher amorphous and less crystalline content.

The thermal treatment unit can be a holding tank with mild heating, or no heating or even active cooling so that the temperature of the slurry is increased or reduced between entry and exit.

In one embodiment, the thermal treating unit is not present.

In one embodiment, the thermally treated slurry, or the second slurry if the thermal treatment unit is not present or not utilized, or the first slurry if the thermal treatment unit and the neutralizing unit are not present or not utilized, is fed to a solids-liquid separation unit where polyvinyl alcohol is separated from the slurry to generate a polyvinyl alcohol wet cake and separated liquids. The solids-liquid separation unit can be a centrifuge and/or filtration device or other conventional solids-liquid separation device.

In an alternate embodiment, the thermal treatment unit and solids-liquid separation unit can be combined in a single unit operation where the residence time of the slurry and solids is sufficient to reduce the temperature of the second slurry to the desired level.

In one embodiment, the process further comprises the step of washing the polyvinyl alcohol wet cake to produce a purified polyvinyl alcohol wet cake, which is then subject to the drying step. The resulting polyvinyl alcohol wet cake can optionally be purified by feeding the wet cake into a washing unit where it is contacted typically with a fresh or recycled methanol stream to remove ash components and other contaminates to generate a purified polyvinyl alcohol wet cake.

In order to generate the final particulate agglomerated polyvinyl alcohol particles, the purified polyvinyl alcohol wet cake after centrifugation, or the wet cake if the washing unit is not present or not utilized, is fed to a drying unit where it is dried via conventional means to remove sufficient remaining liquid content so that the resulting particulate agglomerated polyvinyl alcohol copolymer particles can be recovered, preferably as a free-flowing powder.

D(90) particles sizes of the polyvinyl alcohol copolymer agglomerated particles produced by the above slurry alcohol process range from about 1 µm, or from about 10 to about 1000 µm, or to about 400 µm.

Bulk density of the polyvinyl alcohol copolymer agglomerated particles produced by the above slurry alcohol process is generally about 0.55 g/cm3 or less, or about about 0.50 g/cm$^3$ or less.

Additional process details can be had by reference to previously incorporated US2017/0260309A1 and US2019/0055326A1, as well as U.S. Pat. Nos. 2,734,048, 3,497,487, 3,654,247 and general knowledge of those of ordinary skill in the relevant art.

Blends with Other Polyvinyl Alcohols

In addition to crystallinity modification of the polyvinyl alcohol copolymer, another method for controlling the dissolution time of the particulate diverting agent is by blending the acid-functional polyvinyl alcohol copolymer described above with one or more other fully- or partially-hydrolyzed polyvinyl alcohols of the types disclosed in the above incorporated references, or that are otherwise commercially available or generally known to those of ordinary skill in the art.

Such other polyvinyl alcohols may be chosen to be more soluble than the acid-functional polyvinyl alcohol copolymer, but typically they are chosen to be less soluble and thus extend the dissolution rate of the diverting agent comprising the combination.

In one embodiment, the polyvinyl alcohol component comprises a blend, wherein the acid-functional polyvinyl alcohol copolymer is present in the blend in an amount of from about 10 wt %, or from about 20 wt %, or from about 25 wt %, or from about 33 wt %, or from about 40 wt %, to about 90 wt %, or to about 80 wt %, or to about 77 wt %, or to about 67 wt %, or to about 60 wt %, based on the total weight of the polyvinyl alcohol component.

In one embodiment, the other polyvinyl alcohol is one or more partially- or fully-hydrolyzed polyvinyl alcohol homopolymers. Such polyvinyl alcohol homopolymers are generally commercially available, for example, under the brands KURARAY POVAL™ and ELVANOL™ from Kuraray Co., Ltd. (Tokyo, Japan) and its affiliates.

Transition Grade Blends ("Transition Products")

In one embodiment, the polyvinyl alcohol component is a transition product produced in a continuous hydrolysis process. Such transition product is in essence an intimate reactor blend of multiple polyvinyl alcohol grades as would be recognized by one of ordinary skill in the relevant art.

For example, in many commercial continuous polyvinyl alcohol hydrolysis processes, instead of completely stopping the process and cleaning the equipment, the polyvinyl acetate feed is transitioned and/or the reaction conditions are transitioned from grade to grade. At some point, the process starts producing one grade of specified properties then transitions over time to a second grade of specified properties. This interim production is referred to as a transition grade.

In one embodiment, this transition grade is produced by transitioning production of the acid-functional polyvinyl alcohol copolymer to production of a polyvinyl alcohol homopolymer (or vice versa). In this case, the polyvinyl alcohol homopolymer is less soluble than the acid-functional polyvinyl alcohol copolymer so that the dissolution rate of the particulate diverting agent can be modified.

In another embodiment, the transition grade is produced by altering the hydrolysis conditions, for example, thermal treatment step and/or level of excess catalyst neutralization, which can result in different solubility polyvinyl alcohols from the same starting polyvinyl acetate.

In another embodiment, the transition grade is produced by transitioning both the starting polyvinyl acetate and the hydrolysis conditions (for example, thermal treatment step and/or level of excess catalyst neutralization).

While the exact composition of the transition grade varies as a function of time and is difficult to fully characterize, when different polyvinyl acetate starting materials are used the average composition should fall within the blend proportions as described above.

Additives

The particulate diverting agents of the present invention may also optionally include one or more additives. Such additives include, for example, fillers, plasticizers and starches.

For example, fillers may be blended with the resin component to enhance mechanical properties and regulate the solubility curves of the diverting agents of the present invention.

The amount of filler added can vary widely depending on the desired property modification, for example, up to about 50 wt %, or up to about 30 wt %, or up to about 5 wt %, based on the total weight of the diverting agent.

In many instances it is desirable to have the specific gravity of the diverting agent to be close to that of carrier fluid in order to allow for pumping and satisfactory placement of the diverting agent using the selected carrier fluid.

In some of the embodiments of this invention, a weighting agent filler may be blended with the resin prior to compaction. Weighting agent generally refers to any additive used to increase the density of the resin component.

Weighting agents generally include substances such as natural minerals and inorganic and organic salts. For example, the weighting agent can comprise a metal ion selected from the group consisting of calcium, magnesium, silica, barium, copper, zinc, manganese and mixtures thereof, and a counterion is selected from the group consisting of fluoride, chloride, bromide, carbonate, hydroxide, formate, acetate, nitrate, sulfate, phosphate and mixtures thereof.

Specific examples of fillers include minerals such as $CaCO_3$, $CaCl_2$ and $ZnO$.

One skilled in the art will recognize that plasticizers may be included in manufacturing of the diverting agents of the present invention to improve the flow characteristics of the polyvinyl alcohol.

In order to obtain a uniform plasticizer coating it is preferred to utilize a spray mechanism to coat the polyvinyl alcohol.

A secondary effect of such plasticizers is to reduce any dusting issues with the polyvinyl alcohol materials and ultimate particulate diverting agents.

Materials commonly used as plasticizers for polyvinyl alcohols are generally known to those of ordinary skill in the relevant art, and are generally commercially available. Suitable plasticizers include, for example, compounds such as water, glycerol, polyglycerol, ethylene glycol, polyethylene glycols, ethanol acetamide, ethanol formamide, and acetates of triethanolamine, glycerin, trimethylolpropane and neopenty glycol, and mixtures of one or more of the above.

Plasticizers which are solid or crystalline at ambient temperatures, such as trimethylolpropane, may be dissolved in water or another liquid plasticizer medium for use as a sprayable plasticizer.

Typically the level of the plasticizer can vary up to about 40 wt %, or up to about 30 wt %, or up to about 20 wt %, based on the weight of the polyvinyl alcohol component.

In one embodiment, a diverting agents which yields a combination of good solubility properties and density comprises: (a) from about 60 wt % to about 94 wt % polyvinyl alcohol resin component; (b) from about 5 wt % to about 40 wt % filler; and (c) from about 1 wt % to about 15 wt % plasticizer, based on the combined weight of (a), (b) and (c).

In yet another embodiment, the present invention provides a diverting agent comprising of a blend of the polyvinyl alcohol resin component with a starch. Such blend can typically comprise from about 10 to about 90 parts by weight of the polyvinyl alcohol resin component and from about 90 to about 10 parts by weight of a starch, based on 100 parts by weight of the combination of polyvinyl alcohol resin component and starch. Preferably, however, there should be at least about 30 parts by weight polyvinyl alcohol resin component in any starch blend.

Suitable starches for use in the present invention include natural starches, synthetic starches, physically modified starches, chemically modified starches and mixtures thereof.

One or more other additives can be incorporated to the diverting agent as necessary. The additives include but are not limited to chelators, pH-adjusting agents, oxidizing agents, lost circulation materials, scale inhibitors, corrosion inhibitors, clay control additives, iron control additives, reducers, oxygen scavengers and the like. Use of such other additives in subsurface well operations is generally known to those of ordinary skill in the relevant art, as exemplified by many of the previously incorporated references.

Preparation of Diverting Agents

In one embodiment, the particulate diverting agents of the present invention are prepared by compacting the polyvinyl alcohol component or mixtures described above under pressure.

The mixture compaction can be carried out using conventional compaction methods and equipment, such as a double roll compactor.

In a double roll compactor, the mixture is fed between two counter-rotating roll presses. The rolls apply extreme pressure to press the mixture into a sheet-like form. Desirably, the pressure applied during compaction is at least 5 T, or at least about 10 T. After a certain pressure point, the compaction reaches an effective maximum where there is very little increase in density per unit of additional pressure. In one embodiment of the present invention, this effective maximum is about 30 T of pressure. "T" refers to ton (US)/sq. inch.

Compaction should be sufficient to achieve the desired or necessary bulk density of the resulting particulate diverting agent as described below.

This sheet of material is then fed through a granulator, where it is broken up into sized granules that are random in shape but are desirably reasonably uniform in size. A screener sorts the agglomerated particles according to size. Particle that fall outside the desired size range are recycled from the screener back to the compactor and/or granulator.

Desirably such compaction and granulation is a dry process that does not require an additional drying step.

Suitable particles sizes for the diverting agent of the present invention are as set forth in previously incorporated U.S. Pat. No. 3,724,549.

In general, the particle size of the diverting agent may be graded from 3 mesh, or from 4 mesh, to 200 mesh, or to 170 mesh (U.S. Sieve Series). A typical particle size of the diverting agent in accordance with the present invention is from 3 mesh, or from 4 mesh, or from 5 mesh, to 18 mesh, or to 12 mesh, or to 9 mesh. The "mesh" size refers to US standard mesh.

Particle size distribution can vary widely depending on the permeability of the substrate, carrier fluid, subsurface temperature profile, composition of the diverting agent and other factors recognized by those of ordinary skill in the relevant art.

In an embodiment with both plasticizer and filler, the plasticizer is preferably first added to the polyvinyl alcohol resin component, which is then preferably uniformly blended with one or more of the fillers. The blend is then compacted as described above.

In an embodiment with both plasticizer and starch, the plasticizer is again preferably first added to the polyvinyl alcohol resin component, which is then preferably uniformly blended with the starch. The blend is then compacted as described above.

The particulate diverting agents of the present invention should have a bulk density of about 0.9 g/mL or greater, or about 0.95 g/mL or greater, or about 1 g/mL or greater, or about 1.1 g/mL or greater, or about 1.2 g/mL or greater, or about 1.3 g/mL or greater, or about 1.4 g/mL or greater, or about 1.5 g/mL or greater. In one embodiment, the upper limit of bulk density is about 1.5 g/ml. Bulk density is measured according to ASTM D1895C-17.

Desirably, the bulk density of the particulate diverting agent should be similar to or greater than the carrier fluid used to carry the diverting agent to the subsurface formation.

In some cases, it will be necessary to add fillers (weighting agents) in an amount to reach the desired bulk density, as described above.

Conventional palletization methods can also be used to prepare the diverting agents of the present invention to the extent that such methods can generate sufficient compaction to achieve the desired bulk density.

The shape of the diverting agent of this invention can change in roundness, area, length, width, aspect ratio, and roughness depending on the compaction/granulation/pelletization methods.

Use of Diverting Agents

The particulate diverting agents of the present invention can be used in fluid injection operations for subsurface wells by processes as generally known to those of ordinary skill in the art, and as exemplified in many of the previously incorporated references.

As indicated previously, the particulate diverting agents of the present invention are particularly suitable for use in subterranean formations where formation temperatures are typically about 195° F. or lower, although in some cases the particulate diverting agents can have suitable stability for sufficient time periods at temperatures of up to about 250° F.

EXAMPLES

The following examples will facilitate a more complete understanding of the present invention but it is understood that the invention is not limited to the specific embodiments incorporated therein.

The resins (C-1, C-2 and C-3) utilized to prepare the diverting agents (D-1, D-2 and D-3) in these examples are substantially fully hydrolyzed copolymers of vinyl acetate and methyl acrylate.

Sample C1 was a substantially fully-hydrolyzed acid-functional polyvinyl alcohol copolymer meeting the characteristics described herein, commercially available under the trade designation ELVANOL™ 80-18 (Kuraray America, Inc., Houston, Tex. USA). This product is produced utilizing the commercial process described above with neutralization, heat treatment by adding heat to raise temperature from about 50° C. to about 110-115° C., and methanol washing.

The resin C-2 on the other hand was produced by bypassing the neutralization unit in the production process for ELVANOL™ 80-18 resin, and as a result the excess alkali catalyst was not neutralized and remained in first slurry. The resulting slurry from the neutralization unit was then fed to a thermal treating unit where the slurry temperature was reduced to less than 50° C., after which it was fed to a solids-liquid separation unit where polyvinyl alcohol was separated from the shiny to generate a polyvinyl alcohol wet cake and separated liquids. The resulting wet cake after centrifugation was fed to a drying unit where it was dried via conventional means to remove sufficient remaining liquid content so that the resulting particulate agglomerated polyvinyl alcohol copolymer particles were recovered as a free-flowing powder.

The resin C-3 was 50/50 wt % blend of resin C-1 and resin C-2.

Warm-Water Solubles % (% WWS) was determined as follows.

Polyvinyl alcohol was added/dispersed into de-ionized water (35° C.) to a concentration of 4 wt % (g of polymer/g water). The mixture was then stirred with a triple bladed stirrer running at 200 rpm for at least 3 hours at 20° C. The slurry was then transferred to a 40 ml centrifuge bottle and centrifuged at 1500 rpm for 10 minutes. An aliquot of the resulting supernatant liquid was placed in a pre-weighed aluminum pan and weighed. The sample was evaporated to dryness by placing the sample together with the aluminum pan in an oven set to 105° C. and left overnight to dry. The pan and contents were weighed and the % solubles were then calculated using the following equation:

% $WWS$=(Weight of Residue plus pan−Weight of pan)*100/Weight of sample

Table 1 illustrates that the acid neutralization of the hydrolyzed polyvinyl copolymer followed by heat treatment at 110° C. significantly changes the key water solubility properties of the polymer, as % WWS decreased from 95% to under 5%.

TABLE 1

Warm Water Solubles (% WWS)

| Resin | Treatment of Hydrolysis Product | Heat Treatment | % WWS | Soluble in 195° F. DI Water | Soluble in 195° F. Brine |
|---|---|---|---|---|---|
| C-1 | Acid Neutralization | Yes | 5.0 | Yes | Yes |
| C-2 | No Acid Neutralization | None | 95.0 | Yes | Yes |
| C-3 | — | — |  | Yes | Yes |

A polyethylene glycol (commercially available under the trade designation CARBOWAX™ Polyethylene Glycol 200, The Dow Chemical Company, Freeport, Tex., USA) as plasticizer was sprayed onto the resins C-1 and C-2. In some examples, 1.5 wt % polyethylene glycol was used, and in other examples 11.5 wt % polyethylene glycol was used.

The resin C-3 was produced by blending the resin C-2 and the resin C-3 after application of the polyethylene glycol but before the compaction/granulation.

Example 1

Diverting agents D-1, D-2, and D-3 were prepared from the resin C-2 plasticized with 1.5 wt % polyethylene glycol at a compaction pressure of 5, 20 and 30 T respectively, while the diverting agents D-4 and D-5 were prepared from the resin C-2 plasticized with 11.5 wt % polyethylene glycol at a compaction pressure of 20 and 30 T, as shown Table 2. All the diverting agents were prepared on a pilot scale. The compaction granulation was carried out using a double roll compactor. The plasticized resin was fed between two counter-rotating roll presses. The rolls applied pressure to press the resin into a sheet-like form. This sheet of material was then fed through a granulator where it was broken up into uniformly sized granules. A screener sorted the agglomerated particle according to size. Particles that fell outside the desired size range (6 to 8 mesh) were recycled from the screener back to the compactor. No fillers were used.

TABLE 2

| Diverting Agent | Resin | Compaction Pressure (T) | PEG (wt %) | Density (g/mL) |
|---|---|---|---|---|
| D-1 | C-2 | 5 | 1.5 | 0.94 |
| D-2 | C-2 | 20 | 1.5 | 0.95 |
| D-3 | C-2 | 30 | 1.5 | 1.03 |
| D-4 | C-2 | 20 | 11.5 | 1.04 |
| D-5 | C-2 | 30 | 11.5 | 1.05 |

The solubility of the diverting agents D-1 through D-5 was determined in deionized water at 122° F. and at 149° F.

Solubility Test: Diverting agent solution (6% wt.) was prepared by adding 30 grams of the diverting agent and 470 grams of deionized water into a dissolution vessel. The dissolution vessel was then placed in a water bath. The water bath heat controller was set at the desired temperature (122° F. or 149° F.). The agitator speed inside the dissolution vessel was set at 20 RPM. The timer was started as soon as the temperature inside of the dissolution vessel reached the desired temperature (122° F. or 149° F.). 10 mL of sample in the dissolution vessel was then collected in a centrifuge tube at t: 15, 30, 60, 120, 180, 240, 300, 360 and 420 minutes. The 10 mL sample was placed in centrifuge for 10 minutes at 1,500 RPM. The supernatant liquid was filtered through a 200 mesh sieve screen and placed into a preweighed aluminum pan. The sample together with the aluminum pan was then placed in an oven set to 105° C. and left overnight to dry. The pan and contents were weighed and the % solubles were then calculated using the following equation:

% Water Solubles=(Weight of Residue plus pan−Weight of pan)*100/Weight of sample The solubility in brine was determined using the above procedure except salt water (5.84 grams of sodium chloride in 994.16 grams of deionized water) was used instead of DI water to dissolve the diverting agent.

Results are shown in Tables 3-7.

TABLE 3

| Div. Agent | Time (min) | Dissolution (wt %) @ 122° F. | Div. Agent | Time (min) | Dissolution (wt %) @ 149° F. |
|---|---|---|---|---|---|
| D-1 | 0 | 0 | D-1 | 0 | 0 |
|  | 15 | 37.5 |  | 15 | 66.3 |
|  | 30 | 47.3 |  | 30 | 70.4 |
|  | 60 | 65.0 |  | 60 | 77.0 |
|  | 120 | 66.1 |  | 120 | 82.8 |
|  | 180 | 71.6 |  | 180 | 82.6 |
|  | 240 | 76.9 |  | 240 | 86.3 |
|  | 300 | 84.2 |  | 300 | 86.9 |
|  | 360 | 85.9 |  | 360 | 87.3 |
|  | 420 | 87.3 |  | 420 | 87.0 |

TABLE 4

| Div. Agent | Time (min) | Dissolution (wt %) @ 122° F. | Div. Agent | Time (min) | Dissolution (wt %) @ 149° F. |
|---|---|---|---|---|---|
| D-2 | 0 | 0 | D-2 | 0 | 0 |
|  | 15 | 68.3 |  | 15 | 90.8 |
|  | 30 | 82.8 |  | 30 | 94.4 |
|  | 60 | 87.0 |  | 60 | 94.5 |
|  | 120 | 92.0 |  | 120 | 94.8 |
|  | 180 | 95.0 |  | 180 | 96.2 |
|  | 240 | 95.6 |  | 240 | 96.2 |
|  | 300 | 95.8 |  | 300 | 96.3 |
|  | 360 | 95.7 |  | 360 | 96.3 |
|  | 420 | 96.7 |  | 420 | 96.4 |

TABLE 5

| Div. Agent | Time (min) | Dissolution (wt %) @ 122° F. | Div. Agent | Time (min) | Dissolution (wt %) @ 149° F. |
|---|---|---|---|---|---|
| D-3 | 0 | 0 | D-3 | 0 | 0 |
|  | 15 | 38.1 |  | 15 | 74.2 |
|  | 30 | 68.1 |  | 30 | 84.1 |
|  | 60 | 78.0 |  | 60 | 94.9 |
|  | 120 | 87.8 |  | 120 | 96.7 |
|  | 180 | 96.7 |  | 180 | 97.2 |
|  | 240 | 96.7 |  | 240 | 97.2 |
|  | 300 | 98.7 |  | 300 | 97.2 |
|  | 360 | 98.7 |  | 360 | 97.2 |
|  | 420 | 98.7 |  | 420 | 97.2 |

TABLE 6

| Div. Agent | Time (min) | Dissolution (wt %) @ 122° F. | Div. Agent | Time (min) | Dissolution (wt %) @ 149° F. |
|---|---|---|---|---|---|
| D-4 | 0 | 0 | D-4 | 0 | 0 |
|  | 15 | 44.5 |  | 15 | 76.9 |
|  | 30 | 70.2 |  | 30 | 82.8 |
|  | 60 | 79.8 |  | 60 | 85.0 |
|  | 120 | 92.1 |  | 120 | 94.6 |
|  | 180 | 92.3 |  | 180 | 94.8 |
|  | 240 | 94.7 |  | 240 | 95.6 |
|  | 300 | 94.9 |  | 300 | 96.1 |
|  | 360 | 96.5 |  | 360 | 96.7 |
|  | 420 | 96.5 |  | 420 | 97.3 |

TABLE 7

| Div. Agent | Time (min) | Dissolution (wt %) @ 122° F. | Div. Agent | Time (min) | Dissolution (wt %) @ 149° F. |
|---|---|---|---|---|---|
| D-5 | 0 | 0 | D-5 | 0 | 0 |
|  | 15 | 49.8 |  | 15 | 90.1 |
|  | 30 | 65.8 |  | 30 | 91.3 |
|  | 60 | 81.5 |  | 60 | 91.8 |
|  | 120 | 89.6 |  | 120 | 91.9 |
|  | 180 | 90.8 |  | 180 | 93.2 |
|  | 240 | 92.7 |  | 240 | 93.9 |
|  | 300 | 92.2 |  | 300 | 93.9 |
|  | 360 | 92.2 |  | 360 | 93.9 |
|  | 420 | 92.3 |  | 420 | 94.3 |

As can be seen from the results, dissolution was nearly complete for all cases.

Example 2

Diverting agents D-6, D-7 and D-8 were prepared by plasticizing the resins C-1 C-2 and C-3 with 1.5 wt % polyethylene glycol as described above, and were compacted at 30 T of pressure utilizing the procedure outlined in Example 1 above. The solubility of the diverting agents in both deionized water and salt water (brine, as described above) at 122° F. is shown in Table 8.

The percent dissolution increased with the increase in the amount of C-2 resin (MA copolymer polyvinyl alcohol produced by bypassing the neutralization unit) in the diverting agent.

This demonstrates that tailoring of dissolution rate for specific applications is readily achievable through variation of the type of polyvinyl alcohol.

TABLE 8

| Diverting Agent | Resin | Time (Min) | Rate of dissolution (wt %) Deionized Water | Rate of dissolution (wt %) 0.5% Salt Water |
|---|---|---|---|---|
| D-6 | C-1 | 0 | 0 | 0 |
|  |  | 15 | 63.1 | 48.9 |
|  |  | 30 | 72.5 | 60.6 |
|  |  | 60 | 81.1 | 70.9 |
|  |  | 120 | 81.1 | 75.2 |
|  |  | 180 | 81.7 | 77.7 |
|  |  | 240 | 83.3 | 82.2 |
|  |  | 300 | 83.3 | 83.2 |
|  |  | 360 | 86.1 | 83.2 |
|  |  | 420 | 86.8 | 85.8 |
| D-7 | C-2 | 0 | 0 | 0 |
|  |  | 15 | 38.1 | 47.2 |
|  |  | 30 | 68.1 | 53.5 |
|  |  | 60 | 78.0 | 67.7 |
|  |  | 120 | 87.8 | 80.0 |
|  |  | 180 | 96.7 | 91.8 |
|  |  | 240 | 96.7 | 92.3 |
|  |  | 300 | 98.2 | 92.8 |
|  |  | 360 | 98.7 | 93.1 |
|  |  | 420 | 98.7 | 94.1 |
| D-8 | C-3 | 0 | 0 | 0 |
|  |  | 15 | 23.7 | 50.6 |
|  |  | 30 | 31.3 | 53.2 |
|  |  | 60 | 44.4 | 60.5 |
|  |  | 120 | 70.9 | 75.0 |
|  |  | 180 | 82.6 | 79.2 |
|  |  | 240 | 85.1 | 79.3 |
|  |  | 300 | 88.5 | 81.4 |
|  |  | 360 | 88.5 | 85.7 |
|  |  | 420 | 90.6 | 90.0 |

Example 3

Diverting agents D-9, D-10 and D-11 were prepared by plasticizing the resin C-2 with 1.5 wt % polyethylene glycol as described above, and adding 5 wt %, 10 wt % and 15 wt % $CaCO_3$ prior to compaction respectively as shown on Table 9. The blend of resin, filler and plasticizer was then compacted at 30 T utilizing the procedure outlined in Example 1 above.

The diverting agents were tested for solubility at 122° F. by the procedure as outlined in Example 1. The results are shown in Table 10 below.

As can be seen from the results, an increase in the amount of $CaCO_3$ (with low water solubility) and bulk density corresponded with a decrease in rate of dissolution. This demonstrates that tailoring of bulk density and dissolution rate for specific applications is readily achievable through variation of the type and amount of additives.

TABLE 9

| Diverting Agent | Ingredients - Percent by Weight | | | Bulk Density g/cc (calc) |
|---|---|---|---|---|
| | Resin (C-2) | Plasticizer | CaCO₃ | |
| D-9 | 94.5 | 1.5 | 5 | 1.10 |
| D-10 | 88.5 | 1.5 | 10 | 1.19 |
| D-11 | 83.5 | 1.5 | 15 | 1.27 |

TABLE 10

| Diverting Agent | Resin | Time (Min) | Rate of dissolution (wt %) Deionized Water |
|---|---|---|---|
| D-9 | C-2 | 0 | 0 |
| | | 15 | 44.3 |
| | | 30 | 50.3 |
| | | 60 | 57.3 |
| | | 120 | 64.6 |
| | | 180 | 66.3 |
| | | 240 | 66.5 |
| | | 300 | 67.1 |
| | | 360 | 68.5 |
| | | 420 | 68.9 |
| D-10 | C-2 | 0 | 0 |
| | | 15 | 37.2 |
| | | 30 | 40.1 |
| | | 60 | 45.6 |
| | | 120 | 51.3 |
| | | 180 | 51.8 |
| | | 240 | 55.1 |
| | | 300 | 56.2 |
| | | 360 | 59.5 |
| | | 420 | 59.6 |
| D-11 | C-2 | 0 | 0 |
| | | 15 | 32.3 |
| | | 30 | 33.7 |
| | | 60 | 35.9 |
| | | 120 | 39.2 |
| | | 180 | 41.1 |
| | | 240 | 42.5 |
| | | 300 | 44.0 |
| | | 360 | 45.4 |
| | | 420 | 45.8 |

We claim:

1. A particulate diverting agent comprising particles of a compacted polyvinyl alcohol component comprising a hydrolyzed copolymer of vinyl acetate and one or more unsaturated acids as comonomers, wherein:
   (a) the unsaturated acid is selected from the group consisting of
      (i) a monocarboxylic unsaturated acid,
      (ii) a dicarboxylic unsaturated acid,
      (iii) an alkyl ester of (i),
      (iv) an alkyl ester of (ii),
      (v) an alkali metal salt of (i),
      (vi) an alkali metal salt of (ii),
      (vii) an alkaline earth metal salt of (i),
      (viii) an alkaline earth metal salt of (ii), and
      (ix) an anhydride of (i) and (x) an anhydride of (ii), and
   (b) the hydrolyzed copolymer
      (i) has an unsaturated acid content of from about 0.1 mol % to about 15 mol % based on the total moles of monomers,
      (ii) has a viscosity-average degree of polymerization of from about 300 to about 3000,
      (iii) has a degree of hydrolysis of from about 70 mol % to 100 mol %, and
      (iv) is substantially soluble in water and brine at a temperature of 195° F. or higher; and
   (c) the particulate diverting agent has a bulk density greater than about 0.9 g/cc.

2. The particulate diverting agent of claim 1, which is a compacted mixture comprising the polyvinyl alcohol component and at least one additive selected from the group consisting of a starch, a plasticizer and a filler.

3. The particulate diverting agent of claim 2, further comprising a filler.

4. The particulate diverting agent of claim 3, wherein the filler is a weighting agent.

5. The particulate diverting agent of claim 4, wherein the weighting agent comprises a metal ion selected from the group consisting of calcium, magnesium, silica, barium, copper, zinc, manganese and mixtures thereof, and a counted on is selected from the group consisting of fluoride, chloride, bromide, carbonate, hydroxide, formate, acetate, nitrate, sulfate, phosphate and mixtures thereof.

6. The particulate diverting agent of claim 3, wherein the filler comprises at least one of $CaCO_3$, $CaCl_2$ and ZnO.

7. The particulate diverting agent of claim 2, further comprising a plasticizer.

8. The particulate diverting agent of claim 2, further comprising a starch.

9. The particulate diverting agent of claim 1, wherein the polyvinyl alcohol component comprises a mixture of the hydrolyzed copolymer with at least one other polyvinyl alcohol.

10. The particulate diverting agent of claim 9, wherein the at least one other polyvinyl alcohol has a water solubility lower than the hydrolyzed copolymer.

11. The particulate diverting agent of claim 9, wherein the at least one other polyvinyl alcohol is a fully- or partially-hydrolyzed polyvinyl alcohol homopolymer.

12. The particulate diverting agent of claim 1, wherein the polyvinyl alcohol resin component is a transition product.

13. The particulate diverting agent of claim 1, having a particle size of froth 3 mesh to 200 mesh (U.S. Sieve Series).

14. The particulate diverting agent of claim 13, having a particle size of from 3 mesh to 18 mesh.

15. The particulate diverting agent of claim 1, having a bulk density of about 0.95 g/mL, or greater.

16. A method of making the particulate diverting agent of claim 1, comprising the steps of (A) compacting the polyvinyl alcohol component and (B) granulating the compacted polyvinyl alcohol component to generate the particulate diverting agent.

17. A method of treating a subsurface formation to divert flow of a fluid from one zone of the subsurface formation to another, by pumping into the subsurface formation an an aqueous carrier liquid having dispersed therein a particulate diverting agent, wherein the particulate diverting agent is as set forth in claim 1.

18. The method of claim 17, wherein the treating is done at a temperature of 195° F. or less.

19. The particulate diverting agent of claim 7, further comprising a filler.

20. The particulate diverting agent of claim 7, wherein the polyvinyl alcohol component comprises a mixture of the hydrolyzed copolymer with at least one other polyvinyl alcohol.

* * * * *